United States Patent
Wang

(10) Patent No.: US 11,796,555 B2
(45) Date of Patent: Oct. 24, 2023

(54) PUMP ASSEMBLY HAVING A CONTROLLER INCLUDING A CIRCUIT BOARD AND 3D ROTARY SENSOR FOR DETECTING ROTATION OF ITS PUMP

(71) Applicant: STACKPOLE INTERNATIONAL ENGINEERED PRODUCTS, LTD., Ancaster (CA)

(72) Inventor: Liping Wang, Toronto (CA)

(73) Assignee: Stackpole International Engineered Products, Ltd., Ancaster (CA)

( * ) Notice: Subject to any disclaimer, the term of this patent is extended or adjusted under 35 U.S.C. 154(b) by 1002 days.

(21) Appl. No.: 16/485,650

(22) PCT Filed: Feb. 21, 2018

(86) PCT No.: PCT/IB2018/051078
§ 371 (c)(1),
(2) Date: Aug. 13, 2019

(87) PCT Pub. No.: WO2018/154464
PCT Pub. Date: Aug. 30, 2018

(65) Prior Publication Data
US 2022/0299021 A1 Sep. 22, 2022

Related U.S. Application Data

(60) Provisional application No. 62/462,078, filed on Feb. 22, 2017.

(51) Int. Cl.
*F04B 49/06* (2006.01)
*F04C 14/08* (2006.01)
(Continued)

(52) U.S. Cl.
CPC .............. *G01P 3/487* (2013.01); *F04B 49/06* (2013.01); *F04B 49/20* (2013.01); *F04C 14/08* (2013.01);
(Continued)

(58) Field of Classification Search
CPC ...... F04B 49/06; F04B 49/20; F04D 15/0066; F04C 14/08; G01P 3/44
See application file for complete search history.

(56) References Cited

U.S. PATENT DOCUMENTS 5,197,865 A 3/1993 Sevrain et al.
6,321,563 B1 11/2001 Ikeda et al.
(Continued)

FOREIGN PATENT DOCUMENTS

JP H05-248363 A 9/1993
JP 2010-144607 A 7/2010
(Continued)

OTHER PUBLICATIONS

English translation of JP 2016-223365 obtained Aug. 24, 2022 (Year: 2016).*

(Continued)

*Primary Examiner* — Connor J Tremarche
(74) *Attorney, Agent, or Firm* — Pillsbury Winthrop Shaw Pittman, LLP

(57) ABSTRACT

A pump assembly and a method for sensing rotary motion of the pump therein are disclosed. The pump assembly includes a pump, a controller, and an optional driven electric motor. The components may be axially aligned and mounted relative to one another. The controller includes a circuit board that is oriented in an axial direction of the pump assembly so that it faces in a radial direction. A 3D rotary sensor is mounted on the circuit board and is designed to detect motion parallel to its front face and motion in a plane (Continued)

perpendicular to its front face, including rotary motion of the pump, for output to the controller. The controller is configured to control the pump via controlling the drive shaft of the motor or pump.

24 Claims, 7 Drawing Sheets

(51) Int. Cl.
*F04D 15/00* (2006.01)
*F04B 49/20* (2006.01)
*G01P 3/44* (2006.01)
*G01P 3/487* (2006.01)
*F04C 15/00* (2006.01)
*F04C 2/10* (2006.01)
*F04C 2/344* (2006.01)

(52) U.S. Cl.
CPC .............. *F04C 15/008* (2013.01); *F04C 2/10* (2013.01); *F04C 2/102* (2013.01); *F04C 2/344* (2013.01); *F04C 2240/30* (2013.01); *F04C 2240/40* (2013.01); *F04C 2240/60* (2013.01); *F04C 2240/808* (2013.01); *F04C 2270/0525* (2013.01); *G01P 3/44* (2013.01)

(56) References Cited

U.S. PATENT DOCUMENTS

| 6,329,815 | B1 | 12/2001 | Yamazaki et al. | |
| 8,118,564 | B2* | 2/2012 | Enami | F04C 18/3564 |
| | | | | 417/410.5 |
| 8,749,110 | B2 | 6/2014 | Wong et al. | |
| 8,970,078 | B2 | 3/2015 | Zhang et al. | |
| 2003/0017055 | A1* | 1/2003 | Fong | F04B 49/022 |
| | | | | 417/44.9 |
| 2006/0089784 | A1 | 4/2006 | Spicer et al. | |
| 2013/0265037 | A1* | 10/2013 | Friedrich | G01R 33/09 |
| | | | | 324/207.2 |
| 2015/0260140 | A1 | 9/2015 | Wang | |
| 2015/0316062 | A1 | 11/2015 | Rosinski | |
| 2016/0138587 | A1 | 5/2016 | Huang et al. | |
| 2016/0245283 | A1 | 8/2016 | Chikaoka | |
| 2016/0245674 | A1* | 8/2016 | Ausserlechner | G01D 11/245 |
| 2016/0294248 | A1 | 10/2016 | Atarashi et al. | |
| 2017/0097001 | A1* | 4/2017 | Ott | F04C 15/0065 |

FOREIGN PATENT DOCUMENTS

| JP | 2015-169637 A | | 9/2015 | |
| JP | 2015-533200 A | | 11/2015 | |
| JP | 2016-223365 A | | 12/2016 | |
| JP | 2016223365 A | * | 12/2016 | ............ F04C 11/008 |
| WO | 2014/029885 A1 | | 2/2014 | |
| WO | 2017/025201 A1 | | 2/2017 | |

OTHER PUBLICATIONS

Infineon4Engineers, 3D Magnetic Sensor, Jun. 1, 2015 (Youtube Video) (Year: 2015) 1 pg.
Infineon Technologies, 3D Magnetics, 2019, Infineon Technologies (Year: 2019) 20 pgs.
International Search Report PCT/IB2018/051078 dated May 15, 2018.
Written Opinion of the International Searching Authority PCT/IB2018/051078 dated May 15, 2018.
International Preliminary Report on Patentability PCT/IB2018/051078 dated May 29, 2019.
Notice of Final Rejection dated Aug. 5, 2021, issued in corresponding Korean Patent Application No. 10-2019-7027633 with English translation (8 pgs ).
Extended European Search Report dated Oct. 15, 2020 issued in corresponding European Patent Application No. 18758395.0 (3 pgs.).
Office Action dated Sep. 23, 2020 issued in corresponding Japanese Patent Application No. 2019-543884 with English translation (13 pgs.).
Notification of Reasons for Refusal dated Oct. 21, 2020 issued in corresponding Korean Patent Application No. 10-2019-7027633 with English translation (15 pgs.).

* cited by examiner

3-D Sensing

PUMP ASSEMBLY HAVING A CONTROLLER INCLUDING A CIRCUIT BOARD AND 3D ROTARY SENSOR FOR DETECTING ROTATION OF ITS PUMP

CROSS-REFERENCE TO RELATED APPLICATIONS

This application is a national stage entry of PCT/IB2018/051078, filed Feb. 21, 2018, which claims priority to provisional patent application 62/462,078, filed on Feb. 22, 2017, the entire contents of all of which are incorporated by reference herein in their entirety entireties.

BACKGROUND

Field

The present disclosure is generally related to a pump for providing pressurized fluid to a system. More specifically, the pump is associated with powertrain and is provided in an assembly with controller board(s).

Description of Related Art

It is known, in some cases, to provide a dedicated electrical motor and a controller (with a circuit board and other electrical components) for operation of a fluid pump. FIG. 1 shows an example of a pump assembly 100 with a pump 102, motor 104, and controller 106 in axial alignment.

Typically, the controller includes a printed circuit board (PCB) that runs in the axial direction (along the y-axis of FIG. 1) of the pump. For example, the PCB 108 may be provided in the housing of the controller 106. This PCB can contain the main controller. Typically, the PCB 108 is oriented in the axial direction of the pump assembly so that its main face 112 faces in the radial direction.

In addition to the PCB 108, a rotary sensor 114 sometimes is used to detect (indirectly) rotational speed of the motor/pump elements. This detection or sensing is typically done via mounting the sensor 114 on a second circuit board. A typical approach of mounting a second PCB 116—shown in the form of a 1-D shaft position sensing PCB—is in a perpendicular direction relative to the PCB 108. Because the rotary sensor(s) that are used are typically 1-D or 2-D sensors, they can only detect rotation of objects (e.g., shafts, magnets, etc.) parallel to the sensor's main face. As such, the main (front) face of the sensor 114 needs to face the rotating pump part(s) (including the motor and drive shaft), thus resulting in the fact that the second PCB 116 including sensor 114 must be perpendicular to the PCB 108.

As such, many pumps have the disadvantage of requiring two circuit boards in their design. This requires connection between the two boards, increasing cooling and functioning risk as well as cost.

SUMMARY

It is an aspect of this disclosure to provide a pump assembly that includes a pump having a pump housing, the pump having an inlet for receiving input fluid and a pump outlet for outputting pressurized fluid, and a drive shaft for driving parts of the pump, and a controller configured to drive the drive shaft of the pump. The controller has a circuit board oriented in an axial direction of the pump so that its first side faces in a radial direction. A 3D rotary sensor is mounted on the first side of the circuit board. The 3D rotary sensor has a front face positioned parallel to the first side of the circuit board such that the front face faces the radial direction. The 3D rotary sensor is configured to detect (a) motion parallel to its front face and (b) motion in a plane perpendicular to its front face, including rotary motion of the pump, for output to the controller.

Another aspect of this disclosure provides a pump assembly that has an assembly inlet for inputting fluid, an assembly outlet for outputting fluid, an electric motor contained within a motor casing, a pump having a pump housing, a drive shaft connecting the electric motor to the pump, and a controller configured to drive the electric motor. The pump has an inlet for receiving input fluid from the assembly inlet and a pump outlet for outputting pressurized fluid. The drive shaft is configured to be driven about an axis by the electric motor. The pump and the electric motor are axially aligned with the controller. The controller includes a circuit board oriented in an axial direction of the pump assembly so that it faces in a radial direction. A 3D rotary sensor is mounted on the circuit board such that its front face is positioned parallel to the circuit board such that the front face faces the radial direction. The 3D rotary sensor is configured to detect (a) motion parallel to its front face and (b) motion in a plane perpendicular to its front face, including rotary motion of the pump, for output to the controller. An outlet passage communicates the pump outlet with the assembly outlet to discharge the pressurized fluid.

Yet another aspect provides a method for sensing rotary motion of a pump in a pump assembly. The pump assembly may be one of the configurations as noted above, for example. The method includes driving the drive shaft; inputting fluid through the inlet of the pump; pressurizing input fluid using the pump; detecting via the 3D rotary sensor rotary motion of the pump; controlling using the controller pump output based on the detection from the 3D rotary sensor; and discharging the pressurized fluid through the outlet.

Other aspects, features, and advantages of the present disclosure will become apparent from the following detailed description, the accompanying drawings, and the appended claims.

6, showing a schematic of the relative positioning of the components when using a 3D sensor to sense features of a pump and its shaft.

DETAILED DESCRIPTION OF THE PREFERRED EMBODIMENT(S)

The location, direction, and use of the term "side" herein and throughout this disclosure with reference to the controller 26, circuit board, 3D sensor, and any of the components of the pump assembly 10 are not intended to be limiting, and it should be understood that such features could also be referred to as a top, bottom, upper, lower, first, second, etc. in this disclosure. The location, direction, and corresponding terms are simply for explanatory purposes with reference to the Figures of the illustrated embodiment.

Figure 1:
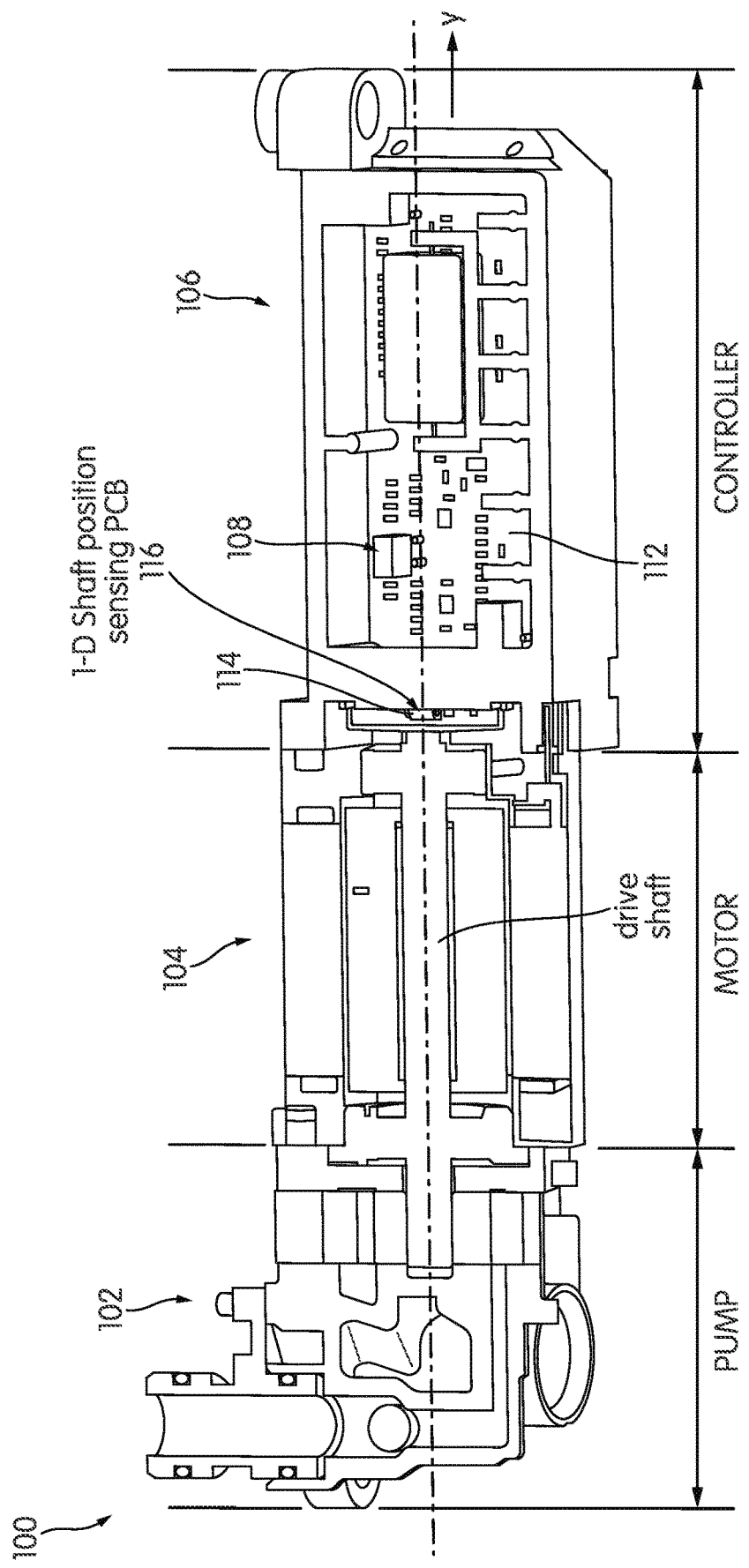
FIG. 1 shows an example of a pump assembly using perpendicularly positioned controller boards according to the prior art.
Figure 2:
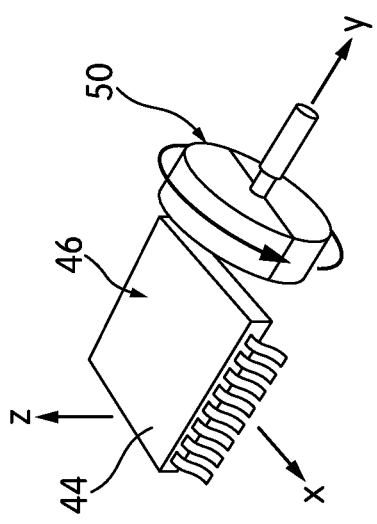
FIG. 2 is a schematic drawing of signal processing and features associated with a 3-D rotary sensor, used with a circuit board in the controller portion of disclosed embodiments herein.
Figure 2:
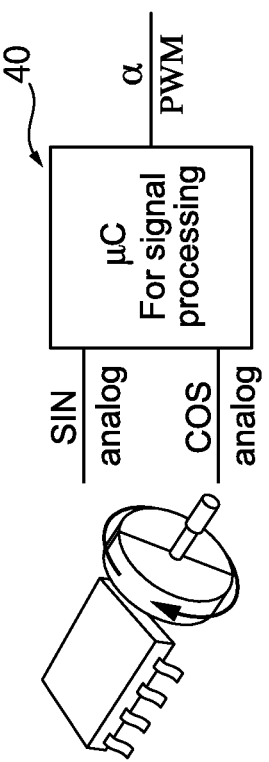
Figure 3:
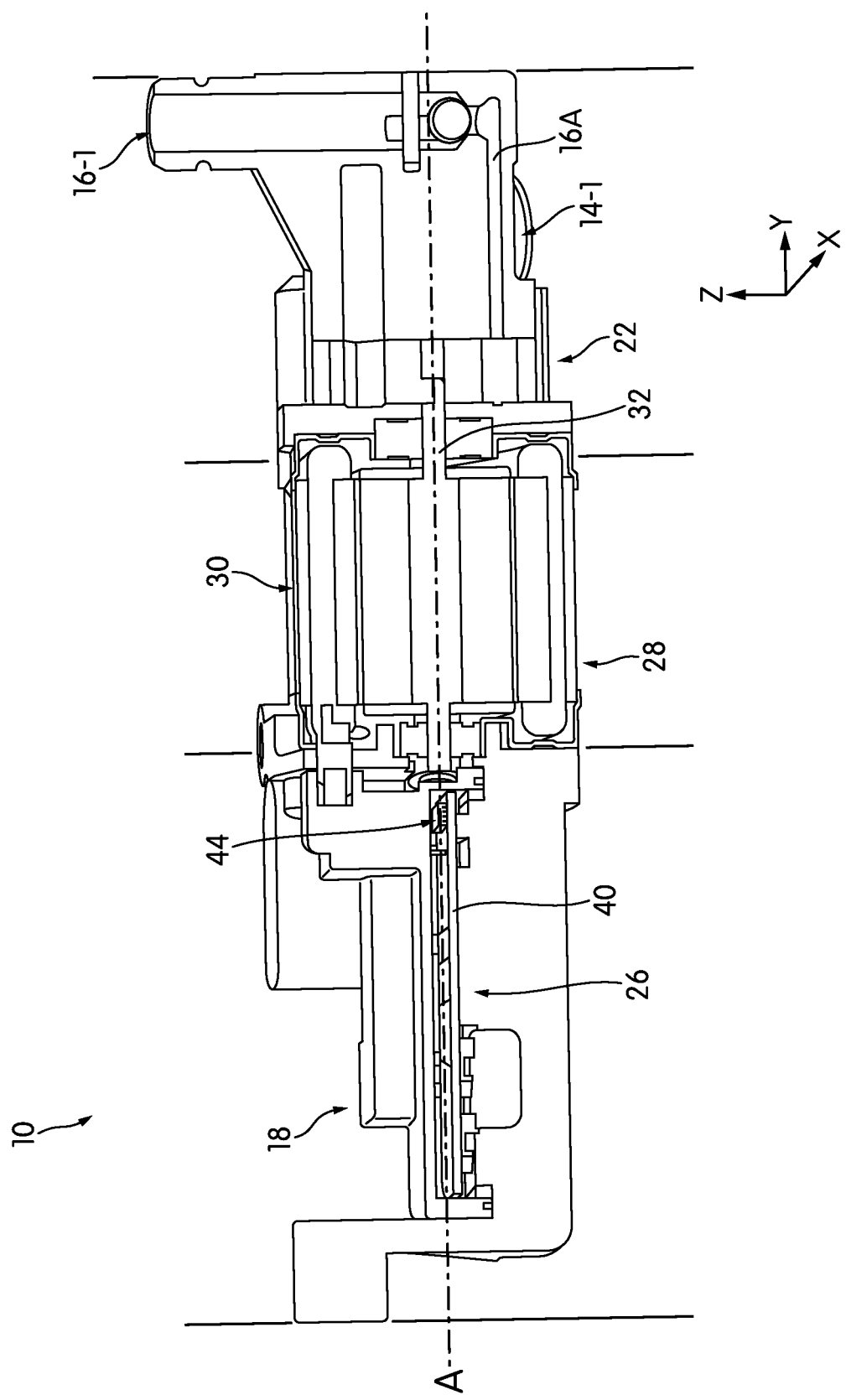
FIG. 3 is a cross-sectional view of a pump assembly, in accordance with one embodiment.

As noted in greater detail below, numerous embodiments as disclosed herein employ the use of a 3D rotary sensor for detecting rotary motion of a pump (directly or indirectly). Throughout this disclosure, a 3D rotary sensor is defined as a monolithic, integrated circuit (IC) sensor that is configured to detect motion on 3 axes—i.e., x, y, and z axes, as generally represented in FIG. 2 and FIG. 3. In the described embodiments, the 3D rotary sensor may be used with a magnet, and, since such a sensor is sensitive to magnetic flux density that is parallel to and perpendicular to the IC sensor mounting face, determinations (e.g., motion or rotation readings) of perpendicularly mounted magnets may be detected.

FIG. 3 illustrates a pump assembly 10, in accordance with an embodiment herein, with its housings and components positioned longitudinally along an axis A (in the Y-direction, or along the Y-axis). The axis A is the axis in which the drive shaft (e.g., drive shaft 32 of the pump 22) of the pump assembly 10 is configured to rotate and drive the parts (pump, motor, etc.) therein. The pump assembly 10 may include a number of housings and/or casings that are assembled or fastened together, or may include a single housing that contains the herein disclosed parts and/or housings and casings therein. The pump assembly 10 includes an assembly inlet 14-1 for inputting fluid, such as a lubricant (e.g., oil or transmission fluid), and an assembly outlet 16-1 for outputting fluid, i.e., fluid that is pressurized by a pump 22 contained therein. In an embodiment, the direction of flow into the assembly inlet and from the assembly outlet may be perpendicular to an overall axial length of the pump assembly 10. For example, the inlet 14-1 and/or the outlet 16-1 may either or both be positioned in and along Z-axis. The fluid enters the pump assembly 10 through the assembly inlet and is guided through an inlet passage 14A, shown in FIG. 4, defined by an inlet pipe to the pump 22. The inlet pipe has an axial length and is fluidly connected to the pump 22 via an inlet thereof. Pressurized fluid from the pump 22 is output via an output passage 16A, also shown in FIG. 4, defined by an outlet pipe and through the assembly outlet 16-1. The outlet pipe has an axial length and may be parallel to the inlet pipe, for example, in one embodiment.

The inlet pipe and outlet pipe are fluidly connected to the pump 22. The pump 22 is encased by a pump hydraulic housing 24, also referred to herein as a pump casing 24. In accordance with an embodiment, the pump casing 24 may be integrally formed with the inlet pipe and outlet pipe. The pump casing 24 encloses the functional pump parts therein and may be shaped to accommodate its pumping parts as well as an outlet passage for directing output flow towards the outlet passage defined in the outlet pipe.

The inlet and outlet pipes associated with the pump 22 in the assembly 10 may be formed from metal, plastic, or any other suitable material. The length of the inlet pipe 14A and/or outlet pipe 16A is not intended to be limiting. In an embodiment, lightweight aluminum or plastic may be used for at least part of the length of the pipes. Moreover, the length(s) of the pipe(s) may be adjusted to accommodate other parts associated with the pump, e.g., such as a pressure relief valve, which are not specifically illustrated here.

The type of pump 22 and its parts provided in the pump assembly 10 is not limited. In accordance with an embodiment, the pump 22 has a gerotor drive, wherein an inner rotor is rotatable driven by the drive shaft 32 to in turn rotatable drive an outer rotor. The inner rotor is fixedly secured to the shaft 32 for rotation about axis A with the drive shaft 32. The outer rotor 52 is rotatably received in the pump parts housing. As is understood by one of ordinary skill in the art, rotation of the inner rotor also rotates the outer rotor via their intermeshed teeth to pressurize the input fluid received in areas between the complimentary parts for output from the pump 22, and thus such details are not described here. In another embodiment, the pump 22 is a variable vane pump that includes a number of vanes therein, a rotor, and a control slide that rotates or pivots about a pin within the housing between a first slide position and a second slide position to adjust displacement of the pump through the outlet. The drive shaft may be configured to drive the rotor of the pump, for example.

The pump 22 is associated with a powertrain and is provided in the assembly 10 with controller board(s). The pump assembly 10 may supply pressurized fluid to a transmission and/or an engine of an automotive vehicle, for example. The powertrain refers to the components that generate power. An associated powertrain may include simply the engine and transmission, in accordance with an embodiment. In another embodiment, the associated powertrain may include additional parts—e.g., drive shafts, gears, differential—in addition to the engine and transmission. In yet another embodiment, the associated powertrain may include an electric motor and controller. Accordingly, one of ordinary skill in the art should understand additional parts or components that may be included with a powertrain, and thus the above noted examples should not be limiting.

Figure 4:
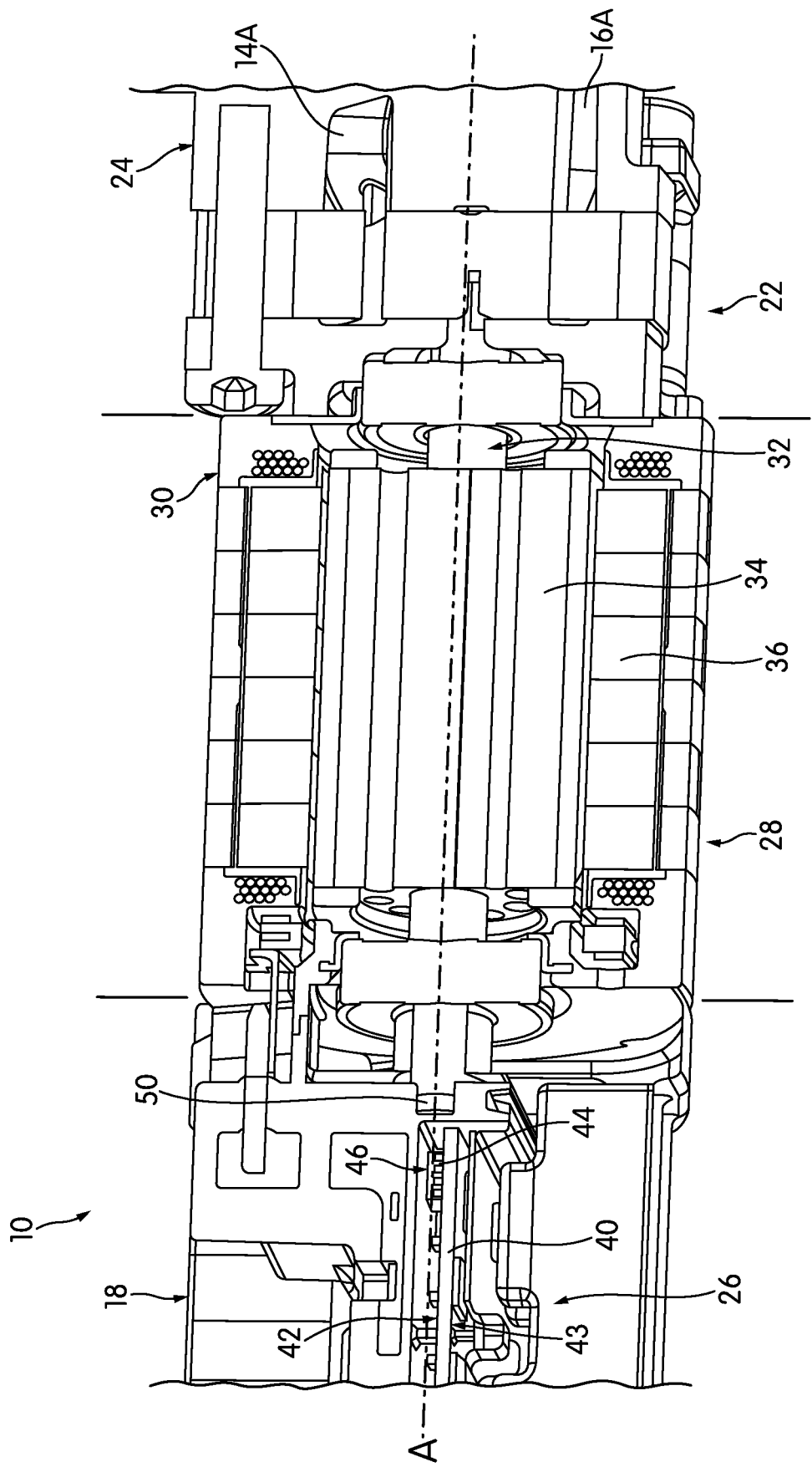
FIG. 4 is a detailed cross-sectional view of the pump assembly of FIG. 3, showing an axially mounted circuit board and 3D sensor in its controller portion/housing, adjacent a motor.

In the pump assembly 10, at least one controller 26 is housed in a controller housing portion 18 or module of the pump assembly 10. The pump 22 and an electric motor 28 are axially aligned with the controller 26 on axis A; in one embodiment, as shown in FIGS. 3 and 4, the pump 22 and controller 26 are provided on opposing axial sides of the motor 28. More specifically, as shown in the cross-sectional view of FIG. 3, for example, the pump 22 and its housing 24 (described below) are provided on one side (e.g., a right side as shown in FIG. 3) of the motor 28 and its casing 30 and the controller 26 and its housing 18 are provided on an opposite axial side (e.g., a left side as shown in FIG. 3) of the motor 28 and its casing 30. In accordance with an embodiment, then, the motor 28 may be flanked by the controller 26 and pump 22 (and thus, their housings are arranged in the same manner). The illustrated arrangement of FIG. 3 is not intended to be limiting, however. In an embodiment, the pump housing 24, the motor casing 30, and the controller housing portion 18 are connected together within the pump assembly 10. Inside the pump assembly 10, a drive shaft 32 connects the electric motor 28 to the pump 22. The drive shaft 32 is driven about axis A by the electric motor 28 to drive the components of the pump 22. The controller 26 controls and thus drives the electric motor 28 to drive the shaft 32. Further, as described in greater detail below, the controller 26 (in particular, its 3D rotary sensor) may be positioned, in one embodiment, and configured to detect rotation of the motor shaft (which may or may not be the same as drive shaft 32 of the motor 28).

The illustrated embodiment of FIGS. 3 and 4 generally shows the drive shaft 32 as being a single shaft that extends from the electric motor 28 and to the pump 22, such that the shaft 32 that is designed to drive the parts is the same shaft. However, in accordance with an embodiment, the electric motor 28 may have its own motor drive shaft configured to be driven about an axis, and still connected to the pump 22. The electric motor 28 may be configured to drive the (separate) drive shaft of the pump 22 via the motor drive shaft.

The electric motor 28 includes a rotor 34 and a stator 36 (see FIG. 4). The rotor 34 is connected to the shaft 32 is contained within the casing 30 along with the stator 36. The motor casing 30 is generally cylindrical and the stator 36 may be fixed thereto.

The pump 22, motor 28, and controller 26, and their respective housings, may be secured together in the pump assembly 10 via connectors, fasteners, bolts, and the like, which is generally known in the art.

The controller 26 of assembly 10 is configured to operate or drive the electric motor 28 (e.g., control a magnetic field of the stator 36 of the motor 28), to thus control and drive the pump 22. As shown in FIGS. 3-4, the controller 26 includes an electronic control unit, or ECU.

Figure 5:
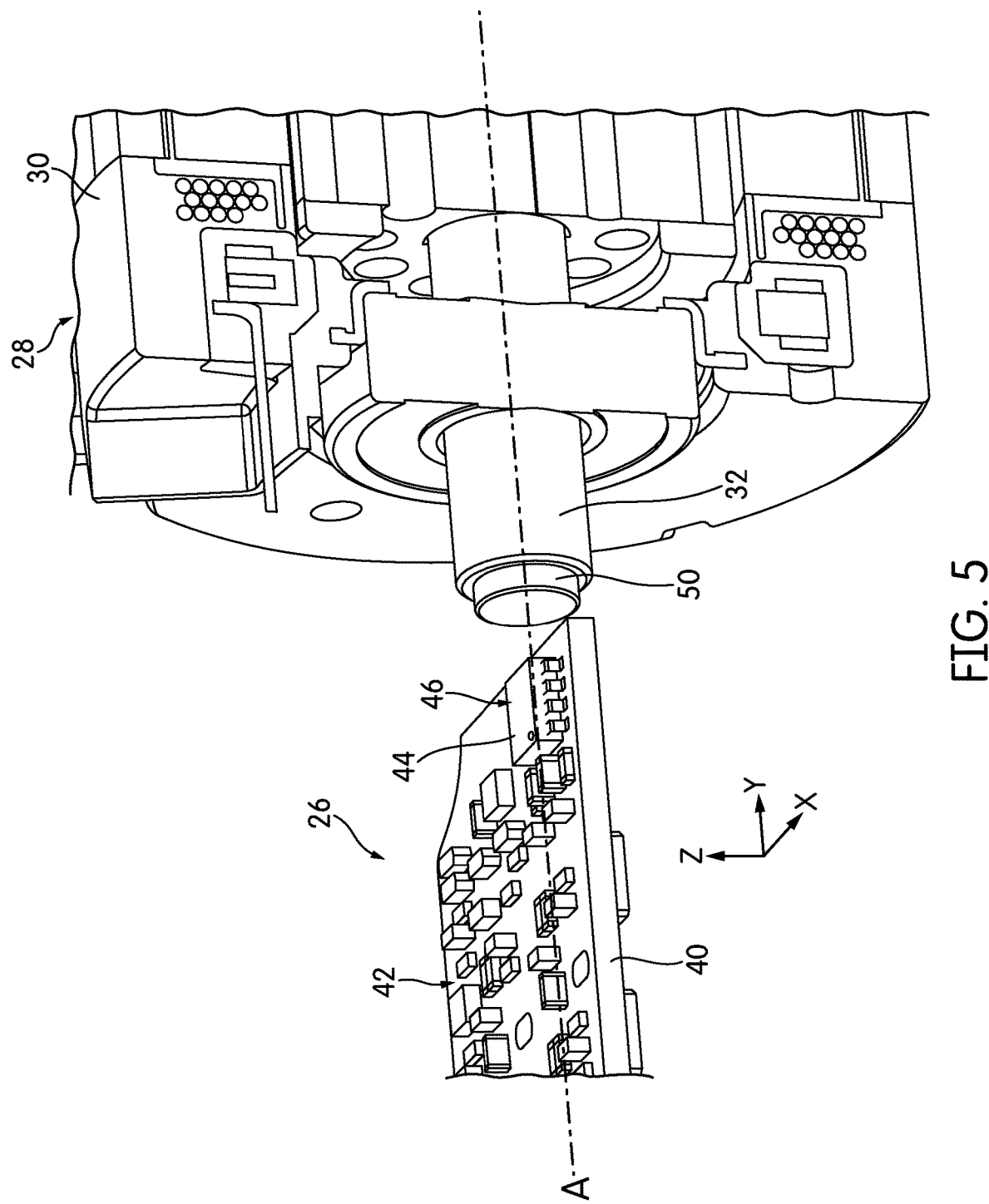
FIG. 5 is a detailed view of the circuit board and motor of the pump assembly of FIG. 3, in accordance with an embodiment, showing a schematic of the relative positioning of the components when using a sensor to sense features of the motor.
Figure 6:
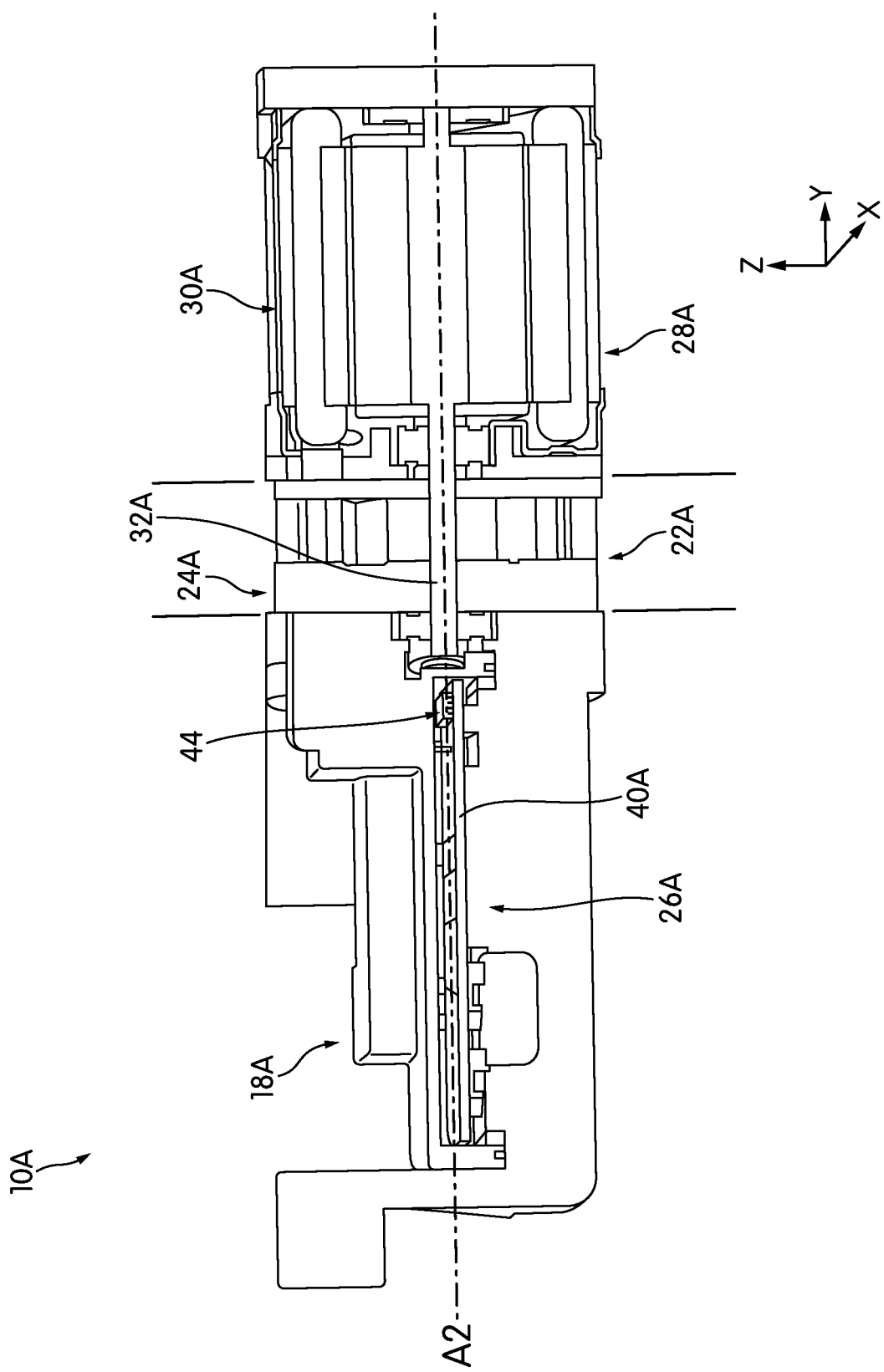
FIG. 6 is a cross-sectional view of a pump assembly, in accordance with another embodiment.

The ECU includes a circuit board 40—or PCB (printed circuit board)—mounted within housing 18, shown here positioned longitudinally (in the Y-direction) along axis A. The PCB may be provided in the housing portion 18 of the controller. This PCB may contain the main controller, for example. The PCB/circuit board 40 has a first face 42 (or first side) and a second face 43 (or second side), the second face 43 being on an opposite side of the first face 42. Each side 42, 43 is represented in the Figures as having an elongated, substantially flat surface, that is configured to receive or connect with a number of electrical and/or sensing components (FIGS. 3, 4, and 5 show multiple components provided on either face 42 or 43, for illustrative purposes, including the later described 3D sensor). Both faces and flat surfaces of the PCB (40) may be positioned to extend in the longitudinal/Y-direction of the pump assembly 10. In the illustrated embodiment, the circuit board 40 is oriented in an axial (Y) direction of the axis A of the pump assembly 10, so that its first face 42 faces upwardly (as shown in FIGS. 5 and 6) in a radial direction (from or relative to axis A). In an embodiment, a longitudinal portion, surface, or face of the circuit board/PCB 40 is axially aligned with the drive shaft 32 on the same axis (axis A). As is generally known in the art, a number of components (sensors and the like) may be mounted on the circuit board 40 for communicating information such that the ECU/controller 26 may control the pump assembly components. Positioning of the circuit board 40 in the longitudinal direction (along axis A) and in axial alignment with the shaft (shaft 32 and pump drive shaft, and other components) in the housing 18 as shown in FIGS. 3 and 4 results in the components occupying less area in the assembly and allows for improved cooling efficiency of the electrical components contained therein.

Figure 7:
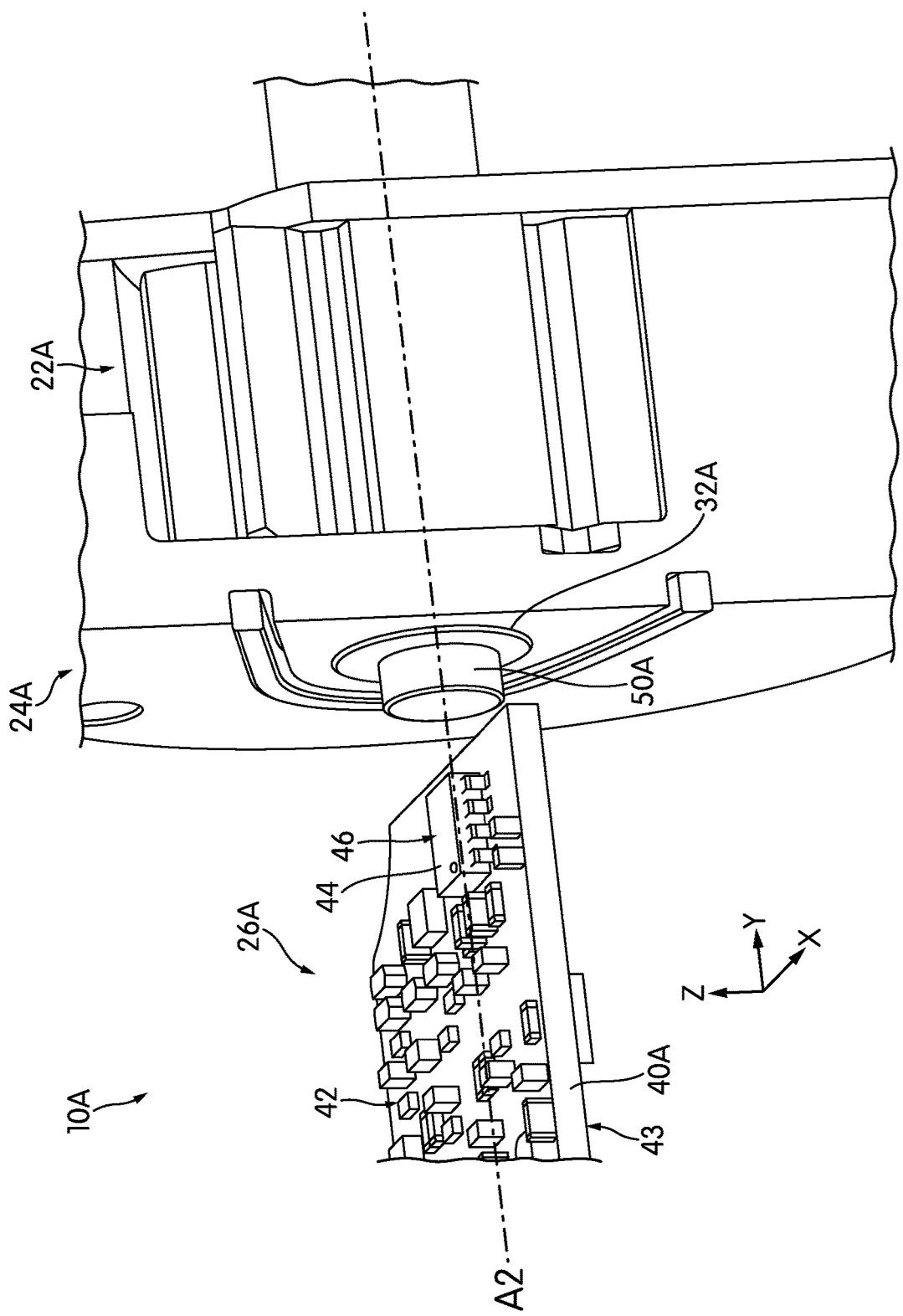
FIG. 7 is a detailed view of a circuit board and a pump provided in a pump assembly, such as the assembly of FIG.

In accordance with an embodiment herein, the ECU also includes a 3D rotary sensor 44. When the 3D sensor 44 is positioned on the circuit board 40, it allows the ECU to determine, measure, or sense features in all three axes (as described previously). A face of the 3D rotary sensor 44 is positioned such that it is parallel with a face of the PCB/circuit board 40 when the sensor 44 is mounted thereon for sensing and detecting and placed in the pump assembly 10. In the illustrated embodiment, the 3D rotary sensor 44 is mounted on the first face 42 of the circuit board 40. That is, in one embodiment, a face of the 3D sensor face is parallel to the top face 42 of the PCB/circuit board 40. However, in another embodiment, the 3D rotary sensor 44 may be mounted in a similar orientation on a bottom the second face 43 or side of the PCB/circuit board 40. Accordingly, instead of being limited to sensing in a single axis (x-axis) or the axial direction or along the x-y axis, the positioning of the 3D rotary sensor 44 in the pump assembly 10 (such as shown in FIG. 5 or FIG. 7) enables reading in the y-z or x-z axis, or combination of both, along with readings using the x-y axis. Accordingly, as described herein, an angular position of the object (e.g., drive shaft 32 or motor shaft) may be measured or sensed even though the 3D rotary sensor 44 (or its body) is positioned on the circuit board 40. The 3D rotary sensor 44 itself has a front face 46 that is positioned parallel to the first face 42 of the circuit board 40 when it is mounted thereon, such that the front face 46 also faces the radial direction (see, e.g., FIG. 5). In this embodiment, the 3D rotary sensor 44 is configured to detect at least motion parallel to its front face 46 and motion in a plane perpendicular to its front face 46, including rotary motion of the pump, for output to the controller 26 during use of the pump assembly 10. Because the sensor 44 is capable of sensing movement in the plane perpendicular to it, it can sense the rotary motion of the motor/pump elements next to it (y-z) even in this orientation.

In accordance with the illustrated embodiment of the pump assembly 10, the 3D rotary sensor 44 is designed to detect motor shaft rotation, i.e., rotation of the drive shaft 32. To detect angular position of the shaft, in one embodiment, the drive shaft 32 has a magnet 50 fixedly attached on or near its end such that the magnet 50 rotates with the drive shaft 32 about axis A. Thus, the ECU may act as a field oriented controller that detects a magnetic field from the magnet 50. More specifically, the 3D rotary sensor 44 is positioned on the circuit board 40 relative to the magnet 50 so that the magnetic field therefrom is detected, thus resulting in the ability to determine, via the controller components/ECU, the shaft's angular position (and thus its rotational speed). For example, as shown in FIG. 5, the 3D rotary sensor 44 may be provided in the form of a sensor chip that may be mounted near or at an end of the circuit board 40 on its face 42 and proximal to the motor 28, so that the sensor 44 is positioned closer to the motor 28, drive shaft 32, and magnet 50 associated therewith. Providing the 3D rotary sensor 44 near or at the end of the circuit board 40 allows for closer positioning relative to the motor/drive shaft/magnet and thus more accurate reading(s).

Limiting the distance between the 3D rotary sensor 44 and the magnet 50 within the housings/assembly may contribute to greater accuracy with regards to determining the rotary speed of the pump. In an embodiment, the sensor 44 is positioned between approximately 2 mm-approximately 4 mm (both inclusive) away from or relative to the magnet 50. Of course, such distances are only exemplary and not intended to be limiting.

Specifically, it should be noted that the illustrated embodiment is not intended to be limiting. The sensor 44 may be positioned in any number of places on the circuit board 40, including on its opposite face (face 43).

The magnet 50 may be a dipole magnet mounted on the shaft 32 and positioned such that it faces the controller housing 18. As such, the 3D rotary sensor is configured to detect rotation of the dipole magnet via its magnetic field, so that it may be used by the controller for determining the rotary motion of the drive shaft (via algorithms/calculations). However, the sensor 44 may sense any type of magnet moving in its surrounding environment and is not intended to be limited to the noted example. Moreover, as further explained below, the sensor 44 may be used to sense a magnet mounted on a shaft or another element associated with the pump 22 itself.

Accordingly, the herein disclosed assembly provides a method for sensing rotary motion of a pump in a pump assembly by using a 3D rotary sensor. Based on the readings from sensor 44 and calculations determined by the ECU, parts of the pump assembly 10 may be controlled via controller 26. In one embodiment, during operation, the electric motor 28 is driven using the controller 26, i.e., the controller 26 drives the drive shaft 32 and the motor 28. In the illustrated embodiment, driving the drive shaft 32 results in driving the pump 22. Fluid is input through the assembly inlet of the pump assembly and into the inlet of the pump 22. The input fluid is pressurized using the pump 22. As the pump operates, the 3D rotary sensor detects rotary motion of the pump 22 via detecting motion of the magnet/motor/drive shaft. The detections or readings from the sensor 44 are used by the ECU/controller 26 to determine any adjustments for the pump assembly 10. In one embodiment, the speed of the electric motor 28 is controlled based on the detection by the 3D rotary sensor 44. The pressurized fluid from the pump 22 is discharged through the assembly outlet.

In another embodiment, parts of the pump 22 may be controlled based on the detection and sensing by 3D rotary sensor 44; that is, the 3D rotary sensor 44 and PCB/controller may be positioned adjacent to and relative to the pump (and its drive shaft), and configured for detection corresponding to the pump. FIG. 6 shows an example of an arrangement of a pump assembly 10A that may include controller 26A provided in a housing 18A that is flanked by a motor 28A and a pump 22A, each in their respective casing and housings, 30A and 24A. The pump assembly 10A may have similar components as previously noted above in the embodiments described with reference to FIGS. 2-5, and thus all of these features are not necessarily repeated here. Still, it should be understood that such features described with reference to pump assembly 10 in FIGS. 2-5 may be included in the assembly 10A. For example, the pump assembly 10A includes an assembly inlet (not shown) for inputting fluid, such as a lubricant (e.g., oil or transmission fluid), and an assembly outlet (not shown) for outputting fluid, i.e., fluid that is pressurized by pump 22A contained therein. In an embodiment, the direction of flow into the assembly inlet and from the assembly outlet may be perpendicular to an overall axial length of the pump assembly 10. For example, the inlet and/or the outlet may either or both be positioned in and along Z-axis.

FIG. 7 is a detailed view of a circuit board 40A of an ECU of at least one controller 26A mounted relative to pump 22A, such as in the pump assembly 10A of FIG. 6, in accordance with another embodiment of this disclosure. Here, the controller 26 (in particular, its 3D rotary sensor) is positioned and is configured to control and/or drive the pump 22A (e.g., via detection rotation of the pump drive shaft, which may or may not be the same as the motor drive shaft). Although the housings for the controller/circuit board and pump are not explicitly shown here, it should be understood that the pump 22A may be contained a separate housing 24A for housing its components (e.g., pump drive shaft, vanes/rotors/gears, control slide, etc.) therein, such as shown in FIG. 6. Similarly, the circuit board 40A may be contained in a housing 18A (see FIG. 6) or enclosure that is part of, or connected to (e.g., via fasteners or bolts), the housing of the pump 22A.

A motor 28A may be provided on an opposite side of the pump 22A, such as shown in FIG. 6, for example, in a motor casing 30A. Accordingly, in one embodiment, the pump assembly 10A may include the pump 22A being flanked on either of its side by the controller 26 and motor 28A. The illustrated arrangement of FIG. 6 is not intended to be limiting, however.

Like the previously described embodiment, the PCB/circuit board 40A of controller 26A has a first face 42 (or first side) and a second face 43 (or second side that is opposite to the first face 42) for mounting electrical components thereon, each side having a substantially flat surface. In the illustrated embodiment, the circuit board 40A is oriented in an axial direction (in the Y-direction) of the axis A2 of the pump assembly 10, so that its first face 42 faces upwardly in a radial direction (from or relative to axis A2). Both faces and flat surfaces of the PCB may be positioned to extend in the longitudinal/Y-direction of the pump assembly 10A. Again, positioning the circuit board 40 in the longitudinal direction (axis A, or Y-direction or Y-axis) and in axial alignment with the shaft 32A of the pump 22A as schematically represented in FIG. 7 results in the components occupying less area and allows for improved cooling efficiency of the electrical components. In an embodiment, a longitudinal portion, surface, or face of the circuit board/PCB 40A is axially aligned with the drive shaft 32A on the same axis (axis A). The 3D rotary sensor 44 may be mounted on the first face 42 (or second face 43) of the circuit board 40A. A front face 46 of the sensor 44 is positioned parallel to the relative face of the circuit board 40A when it is mounted thereon, such that the front face 46 also faces the radial direction.

As previously discussed, in accordance with an embodiment, the orientation of the circuit board 40A may be relative to a drive shaft 32A of the pump itself 22A, so that the pump shaft rotation/speed of the drive shaft 32A of the pump 22A may be determined via the 3D sensor 44 and the controller. The 3D rotary sensor 44 may detect pump shaft rotation using a magnet 50A (e.g., a dipole magnet) that is fixedly attached on or near the end of the drive shaft 32A such that the magnet 50A rotates with the drive shaft 32A about axis A2. Thus, the ECU may act as a field oriented controller that detects a magnetic field from the magnet 50A. Accordingly, the 3D rotary sensor 44 enables reading in the y-z or x-z axis, or combination of both, along with readings using the x-y axis. In this embodiment, the 3D rotary sensor 44 is configured to detect at least motion parallel to its front face 46 and motion in a plane perpendicular to its front face 46, including rotary motion of the pump, for output to the controller 26 during use of the pump.

Because the sensor 44 is capable of sensing movement in the plane perpendicular to it, it can sense the rotary motion of the pump elements next to it (y-z) in this orientation. Accordingly, an angular position of the object (e.g., drive shaft 32A) may be measured or sensed even though the 3D rotary sensor 44 (or its body) is positioned on the circuit board 40. In the illustrated embodiment, the controller or ECU may be configured to sense drive shaft 32A features (rotation, speed) and control the operation or rotation of the drive shaft 32A of the pump 22A. However, the 3D rotary sensor need not be limited to positioning adjacent the drive shaft 32A. For example, in another embodiment, the ECU/controller and sensor 44 associated with pump 22A may be used to sense a position of a control slide within pump 22A and/or change (e.g., reduce) a position of the control slide, resulting in a change in output of pressurized fluid. Thus, it should be understood that the readings from sensor 44 may be used by controller/ECU to control any number of parts of the pump 22A.

Accordingly, the herein disclosed assembly provides a method for sensing rotary motion of a pump on more than one axis by using a 3D rotary sensor and a controller (ECU). The controller is an ECU that includes a printed circuit board (PCB) that runs in the axial direction (along the y-axis) of the pump and/or pump assembly. Fluid is input through the inlet of the pump 22A. The input fluid is pressurized using the pump 22A. As the pump operates, the 3D rotary sensor detects rotary motion of the pump 22A via detecting motion of the magnet 50A/drive shaft. Based on the readings from sensor 44 and calculations determined by the ECU, parts of the pump 22A may be controlled via controller. In one embodiment, during operation, the drive shaft 32A of the pump 22A is driven using the controller. In another embodiment, the controller may alter a position of the slide within the pump housing such that displacement through the pump outlet is altered. The pressurized fluid from the pump 22A is discharged through its outlet.

The type of pump 22A in FIGS. 6 and 7 and its parts provided in the pump assembly 10 is not limited. In accordance with an embodiment, the pump 22A has a gerotor drive with an inner rotor and an outer rotor. The inner rotor is fixedly secured to the shaft 32 for rotation about axis A with the drive shaft 32. In another embodiment, the pump 22A is a variable vane pump that includes a number of vanes therein, a rotor, and a control slide that rotates or pivots about a pin within the housing between a first slide position and a second slide position to adjust displacement of the pump through the outlet. The drive shaft 32A may be configured to drive the rotor of the pump, for example.

Also, it is again noted that limiting the distance between the 3D rotary sensor 44 and the magnet 50A may contribute to greater accuracy with regards to determining the rotary speed of the pump. In an embodiment, the sensor 44 is positioned between approximately 2 mm-approximately 4 mm (both inclusive) away from or relative to the magnet 50A. Of course, such distances are only exemplary and not intended to be limiting.

The herein disclosed combination of circuit board 40 and 3D rotary sensor 44 in the illustrated embodiments eliminates previous multi-board connection risks and provide smaller overall packaging with regards to the controller portion. The 3D rotary sensor 44 also provides greater freedom of choice for its orientation on the PCB/circuit board 40 (as opposed to its face 46 being directly mounted in front of a shaft). It also allows for increased design flexibility with regards to the parts of the pump assembly and mounting relative to the shaft/magnet being detected. The 3D rotary sensor provides an increased advantage of detecting motion relative to a third axis. In particular, although detection in the axial direction (e.g., y-axis) is relatively or generally zero, the 3D rotary sensor allows for detection in the X and Z axes for determining rotary movement of the pump.

Additionally, using the 3D rotary sensor maintains/allows for optimal cooling of the circuit board and controller parts. It allows for the circuit board 40 to maintain its orientation such that it is positioned axially within the housing, with the 3D sensor thereon, so that thermal heat sinking is maximized. Mounting the 3D sensor on a side of the circuit board still allows detection of motion in the three axes. Further, mounting of the 3D sensor on a side of the circuit board reduces, if not provides limited to no risk of damage to the chip/sensor itself, including its exposure to heat (as compared to traditional mountings that require perpendicular mountings directly in front of and adjacent to the detected object).

The electrical components can be developed independent of pump construction. Moreover, costs are lowered since additional sensor(s), an additional circuit board, wiring, and assembly (time) which are typically provided in conventional systems, are either reduced or eliminated in the herein disclosed pump assembly 10.

The type and manufacturer of the 3D rotary sensor 44 are not intended to be limiting. FIG. 2 is a schematic view of exemplary parts which may be used for sensor 44 in the disclosed pump assembly 10. In an embodiment, the 3D rotary sensor 44 is a monolithic sensor sensitive to the magnetically flux density applied orthogonally and parallel to its surface, thus providing the capability of sensing magnetic flux density in three (3) directions: x, y, and z, without contact. The sensor 44 may sense any magnet moving its in surroundings by measuring and processing the three spatial components of the magnetic flux density vector.

In an embodiment, the signal processing of the pc/microcontroller (which corresponds to PCB/controller 40) shown in FIG. 2 may be designed to acquire SIN and COS analog information via the 3D rotary sensor 44. The controller 40 may be is designed to process any signal corrections for sensitivity mismatch and offset to compensate non-ideal magnetic field angle components, for example, in accordance with an embodiment. An angular position calculation (e.g., arctangent interpolation) may be performed and translated to a digital output signal (a kHz PWM signal) for measurement by a demo board and/or processing by an application module or other controller associated with the pump assembly 10. Of course, this schematic illustration is exemplary only and should be understood to be an non-limiting embodiment for processing using the disclosed 3D rotary sensor 44 and controller 40.

The controller 26 (and optionally its PCB/board 40) may include other components including, but not limited to, integrated LIN inductors and other sensors (e.g., temperature sensor) mounted thereon. The controller 26 may be electrically coupled to a power source (e.g., battery) via a local interconnect network (LIN) bus interface, for example. In addition, conventionally, positive and negative power connectors may be also overmolded into the controller cover.

Use of the 3D rotary sensor as disclosed herein allows for use of a single controller circuit board for detection relating to the operation of the pump and rotation of a relative shaft (as opposed to using two or more circuit boards that are mounted perpendicularly relative to one another, as described previously, to detect motion of a shaft). However, it should be understood that other controller boards may be used in the assembly or associated with the pump for controlling operation thereof.

In addition, although the 3D rotary sensor 44 as described above and illustrated in in the embodiments of FIGS. 3-5 is designed detect motion associated with the magnet 50/drive shaft 32/motor 28 in the pump assembly 10, it should be noted that, depending on the positioning and alignment of the controller 26, motor 28, and pump 22 in the assembly 10, the ECU may detect or sense features associated with other parts of the assembly, including parts of the pump 22. For example, if the assembly includes a controller flanked by a motor and a pump, such as shown in FIGS. 6-7, then the 3D rotary sensor of the ECU can be positioned to detect rotation of the pump shaft (which may or may not be the same as drive shaft 32 of the motor 28), or the drive shaft of the motor 28.

In some embodiments, a plane across the first face 42 of the PCB/circuit board 40 and/or 40A is positioned in alignment with axis A and/or A2 of the drive shaft(s) of the motor and/or pump. In an embodiment, the PCB is placed within housing 18 and/or 18A such that it is parallel to the axis A and/or A2 of the drive shaft of the pump (which may be drive shaft 32, 32A, or another shaft that is driven by that shaft).

While the principles of the disclosure have been made clear in the illustrative embodiments set forth above, it will be apparent to those skilled in the art that various modifications may be made to the structure, arrangement, proportion, elements, materials, and components used in the practice of the disclosure.

It will thus be seen that the features of this disclosure have been fully and effectively accomplished. It will be realized, however, that the foregoing preferred specific embodiments have been shown and described for the purpose of illustrating the functional and structural principles of this disclosure and are subject to change without departure from such principles. Therefore, this disclosure includes all modifications encompassed within the spirit and scope of the following claims.

What is claimed is:

1. A pump assembly comprising:
    a pump having a pump housing, the pump having an inlet for receiving input fluid and a pump outlet for outputting pressurized fluid, and a drive shaft for driving parts of the pump to pressurize the input fluid for output from the pump housing;
    an electric motor configured to drive the drive shaft of the pump;
    a controller configured to control the electric motor to drive the drive shaft of the pump, the controller comprising a circuit board having a first face with electrical components mounted thereon, the first face being a major face surface of the board and extending in longitudinal and lateral directions of the circuit board between edges thereof, the circuit board being oriented with its longitudinal direction extending in an axial direction of the pump so that its first face faces in a radial direction;
    a magnet fixedly attached on a rotatable element of either the pump or the electric motor for rotation therewith;
    a 3D rotary sensor mounted on the first face of the circuit board, the 3D rotary sensor comprising a front face positioned parallel to the first face of the circuit board such that the front face of the 3D rotary sensor also faces in the radial direction, the 3D rotary sensor configured to detect both (a) motion parallel to its front face and (b) motion in a plane perpendicular to its front face, including rotary motion of the pump, for output to the controller,
    wherein the 3D rotary sensor is positioned in proximity to the magnet and spaced apart from the magnet in the axial direction to detect rotary motion thereof in the plane perpendicular to the front face of the 3D rotary sensor and the first face of the circuit board such that an angular position of the rotatable element is determined.

2. The pump assembly according to claim 1, further comprising a motor drive shaft for the electric motor, the electric motor being connected to the pump, the motor drive shaft being configured to be driven about an axis, and wherein the electric motor is configured to drive the drive shaft of the pump via the motor drive shaft.

3. The pump assembly according to claim 2, wherein the motor drive shaft of the electric motor and the drive shaft of the pump are the same in that a single shaft extends from the electric motor to the pump for rotation about the axis, and wherein the axis for the single shaft is parallel with the longitudinal direction of the circuit board.

4. The pump assembly according to claim 1, wherein the 3D rotary sensor is configured to detect rotary motion of the drive shaft of the pump, and wherein the controller is configured to adjust a speed at which the drive shaft of the pump is driven based on the detection.

5. The pump assembly according to claim 1, wherein the magnet is a dipole magnet, wherein the drive shaft of the pump has the dipole magnet mounted thereon, and wherein the 3D rotary sensor is configured to detect rotation of the dipole magnet such that the controller determines rotary motion of the drive shaft of the pump based on the detected rotation.

6. The pump assembly according to claim 2, wherein the magnet is a dipole magnet, wherein the motor drive shaft of the electric motor has the dipole magnet mounted thereon, wherein the 3D rotary sensor is mounted near or at an end of the circuit board and proximal to the electric motor so that the 3D rotary sensor is positioned closer to the electric motor, motor drive shaft, and dipole magnet associated therewith, and wherein the 3D rotary sensor is configured to detect rotation of the dipole magnet such that the controller determines rotary motion of the motor drive shaft of the electric motor based on the detected rotation, and wherein the controller is configured to adjust speed for driving the motor drive shaft of the electric motor based on the detection.

7. The pump assembly according to claim 1, wherein the electric motor is flanked by the controller and the pump in the pump assembly.

8. The pump assembly according to claim 1, wherein the pump is flanked by the controller and the electric motor in the pump assembly.

9. A pump assembly comprising:
    an assembly inlet for inputting fluid;
    an assembly outlet for outputting fluid;
    an electric motor contained within a motor casing;
    a pump having a pump housing, the pump having an inlet for receiving input fluid from the assembly inlet and a pump outlet for outputting pressurized fluid;
    a drive shaft connecting the electric motor to the pump, the drive shaft being configured to be driven about an axis by the electric motor for driving parts of the pump to pressurize the input fluid for output from the pump housing;
    a controller configured to control the electric motor to drive the draft shaft, wherein the pump and the electric motor are axially aligned with the controller, the controller comprising a circuit board having a first face with electrical components mounted thereon, the first face being a major face surface of the circuit board and extending in longitudinal and lateral directions of the circuit board between edges thereof, the circuit board being oriented with its longitudinal direction extending in an axial direction of the pump assembly so that the first face faces in a radial direction;
    a magnet fixedly attached on a rotatable element of either the pump or the electric motor for rotation therewith;
    a 3D rotary sensor mounted on the circuit board, the 3D rotary sensor comprising a front face positioned parallel to the circuit board such that the front face of the 3D rotary sensor also faces in the radial direction, the 3D rotary sensor configured to detect both (a) motion parallel to its front face and (b) motion in a plane perpendicular to its front face, including rotary motion of the pump, for output to the controller; and an outlet passage communicating the pump outlet with the assembly outlet to discharge the pressurized fluid, wherein the 3D rotary sensor is positioned in proximity to the magnet and spaced apart from the magnet in the axial direction to detect rotary motion thereof in the plane perpendicular to the front face of the 3D rotary sensor and the first face of the circuit board such that an angular position of the rotatable element is determined.

10. The pump assembly according to claim 9, wherein the magnet is a dipole magnet, wherein the drive shaft has a dipole magnet mounted thereon, and wherein the 3D rotary sensor is configured to detect rotation of the dipole magnet such that the controller determines rotary motion of the drive shaft based on the detected rotation, and wherein the controller is configured to adjust speed for driving the drive shaft based on the detection.

11. The pump assembly according to claim 9, wherein the electric motor is flanked by the controller and the pump in the pump assembly.

12. The pump assembly according to claim 9, wherein the pump is flanked by the controller and the electric motor in the pump assembly.

13. A method for detecting rotary motion of a pump in a pump assembly, the pump assembly comprising: a pump having a pump housing, the pump having an inlet for receiving input fluid and a pump outlet for outputting pressurized fluid, a drive shaft for driving parts of the pump to pressurize the input fluid for output from the pump housing, an electric motor configured to drive the drive shaft of the pump, a controller configured to control the electric motor to drive the drive shaft of the pump, the controller comprising a circuit board having a first face with electrical components thereon, the first face being a major face surface of the circuit board and extending in longitudinal and lateral directions of the circuit board between edges thereof, the circuit board being oriented with its longitudinal direction extending in an axial direction of the pump so that its first face faces in a radial direction; a magnet fixedly attached on a rotatable element of either the pump or the electric motor for rotation therewith; a 3D rotary sensor mounted on the first face of circuit board, the 3D rotary sensor comprising a front face positioned parallel to the circuit board such that the front face of the 3D rotary sensor also faces in the radial direction, the 3D rotary sensor configured to detect both (a) motion parallel to its front face and (b) motion in a plane perpendicular to its front face, including rotary motion of the pump, for output to the controller; the method comprising:

driving the drive shaft;
inputting fluid into the inlet of the pump;
pressurizing input fluid using the pump;
detecting, via the 3D rotary sensor, rotary motion of the drive shaft of the pump;
controlling, using the controller, pump output based on the detection from the 3D rotary sensor; and
discharging the pressurized fluid through the outlet,
wherein the 3D rotary sensor is positioned in proximity to the magnet and spaced apart from the magnet in the axial direction to detect rotary motion thereof in the plane perpendicular to the front face of the 3D rotary sensor and the first face of the circuit board such that an angular position of the rotatable element is determined.

14. The method according to claim 13, wherein the magnet is a dipole magnet, wherein the pump assembly further comprises the dipole magnet mounted on the drive shaft of the pump, and wherein the detecting via 3D rotary sensor comprises detect rotation of the dipole magnet such that the controller determines rotary motion of the drive shaft based on the detected rotation.

15. The method according to claim 13, wherein the pump assembly further comprises a motor drive shaft of the electric motor, the electric motor being connected to the pump, the motor drive shaft being configured to be driven about an axis, the electric motor being configured to drive the drive shaft of the pump via the motor drive shaft, and the method further comprising:

driving the electric motor using the controller, and
driving the motor drive shaft;
wherein the detecting via 3D rotary sensor comprises detect rotation of the motor drive shaft such that the controller determines rotary motion of the pump based on the detected rotation.

16. The method according to claim 15, wherein the motor drive shaft of the electric motor and the drive shaft of the pump are the same in that a single shaft extends from the electric motor to the pump for rotation about the axis, and wherein the axis for the single shaft is parallel with the longitudinal direction of the circuit board.

17. The method according to claim 13, wherein the controlling of the pump output comprises adjusting a speed at which the drive shaft of the pump is driven based on the detecting via the 3D rotary sensor.

18. The method according to claim 15, wherein the magnet is a dipole magnet, wherein the motor drive shaft of the electric motor has the dipole magnet mounted thereon, wherein the 3D rotary sensor is mounted near or at an end of the circuit board and proximal to the electric motor so that the 3D rotary sensor is positioned closer to the electric motor, motor drive shaft, and dipole magnet associated therewith, and wherein the 3D rotary sensor is configured to detect rotation of the dipole magnet such that the controller determines rotary motion of the drive shaft of the electric motor based on the detected rotation.

19. The method according to claim 15, wherein the controlling of the pump output comprises adjusting a speed at which the drive shaft of the electric motor is driven based on the detecting via the 3D rotary sensor.

20. The pump assembly according to claim 1, wherein the circuit board is aligned with the rotatable element such that a plane across the first face of the circuit board is axially aligned with an axis for rotation of the rotatable element.

21. The pump assembly according to claim 1, wherein the 3D sensor is positioned between approximately 2 mm and approximately 4 mm relative to the magnet.

22. The pump assembly according to claim 1, wherein the angular position of the rotatable element is determined via the controller acquiring SIN and COS analog information via the 3D rotary sensor and processing said information.

23. The method according to claim 13, wherein the controlling using the controller comprises determining the angular position of the rotatable element via the controller acquiring SIN and COS analog information via the 3D rotary sensor and processing said information.

24. The pump assembly according to claim 1, wherein the first face of the circuit board is aligned on a same axis as the pump or the electric motor.

* * * * *